United States Patent
Han

(10) Patent No.: US 9,146,389 B2
(45) Date of Patent: Sep. 29, 2015

(54) ZOOM LENS SYSTEM

(71) Applicant: HANWHA TECHWIN CO., LTD., Changwon-Si (KR)

(72) Inventor: Hee-Joong Han, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 48 days.

(21) Appl. No.: 13/955,666

(22) Filed: Jul. 31, 2013

(65) Prior Publication Data

US 2014/0198392 A1 Jul. 17, 2014

(30) Foreign Application Priority Data

Jan. 11, 2013 (KR) .................. 10-2013-0003508

(51) Int. Cl.
*G02B 15/14* (2006.01)
*G02B 15/177* (2006.01)

(52) U.S. Cl.
CPC .................. *G02B 15/177* (2013.01)

(58) Field of Classification Search
CPC .. G02B 15/173; G02B 15/161; G02B 15/177; G02B 13/04
USPC .................. 359/676, 680–682, 691
See application file for complete search history.

(56) References Cited

U.S. PATENT DOCUMENTS

| | | | |
|---|---|---|---|
| 5,550,679 A * | 8/1996 | Sugawara | 359/689 |
| 6,989,941 B2 | 1/2006 | Tomioka | |
| 7,046,454 B2 | 5/2006 | Tomioka | |
| 8,085,474 B2 | 12/2011 | Wei | |
| 2006/0007560 A1 * | 1/2006 | Itoh | 359/691 |
| 2010/0182677 A1 | 7/2010 | Wang et al. | |

FOREIGN PATENT DOCUMENTS

| | | |
|---|---|---|
| JP | 4280538 B2 | 6/2009 |
| JP | 4597623 B2 | 12/2010 |
| JP | 2011-18009 A | 1/2011 |
| KR | 10-2010-0020907 A | 2/2010 |
| KR | 10-2012-0072959 A | 7/2012 |
| WO | 2012/086890 A1 | 6/2012 |

* cited by examiner

*Primary Examiner* — James Greece
(74) *Attorney, Agent, or Firm* — Sughrue Mion, PLLC

(57) ABSTRACT

A zoom lens system that includes a first lens group including at least one lens and having a negative refractive power, and a second lens group including at least one lens and having a positive refractive power in an order from an object side to an image side, wherein the zoom lens system is configured to perform zooming by changing a distance between the first lens group and the second lens group and satisfies: $2<|f1/fw|<2.5$ and $0.60<|f1/f2|<0.85$, wherein f1 indicates a synthetic focal length of the first lens group, fw indicates an overall focal length at a wide angle end, and f2 indicates a synthetic focal length of the second lens group.

19 Claims, 8 Drawing Sheets

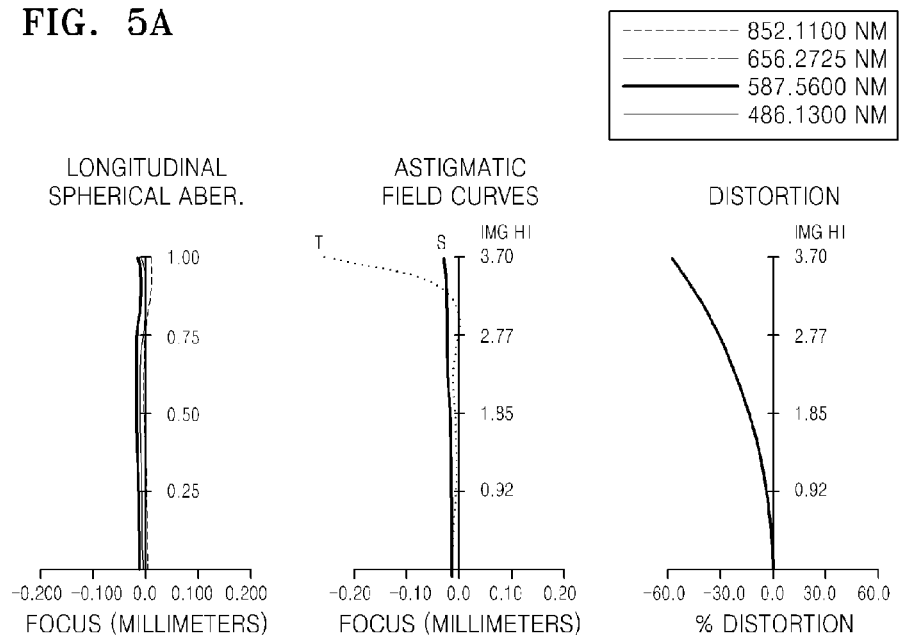
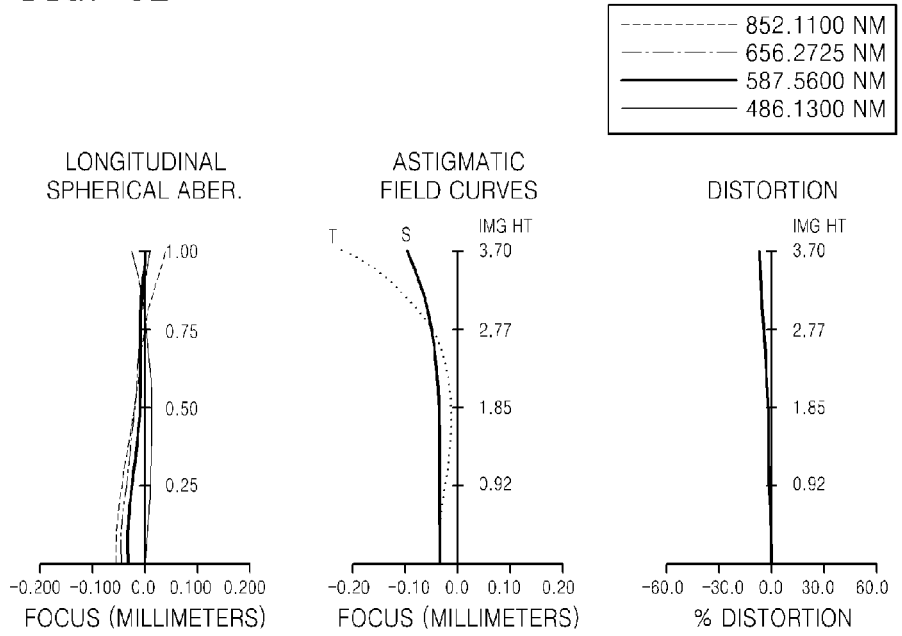

WIDE ANGLE END

TELE-END

ZOOM LENS SYSTEM

CROSS-REFERENCE TO RELATED PATENT APPLICATION

This application claims priority from Korean Patent Application No. 10-2013-0003508, filed on Jan. 11, 2013, in the Korean Intellectual Property Office, the disclosure of which is incorporated herein in its entirety by reference.

BACKGROUND

1. Field

Apparatuses consistent with exemplary embodiments relate to a zoom lens system, and more particularly, to a two-group zoom lens system.

2. Description of the Related Art

Photographing/image pick-up devices that realize an image by using a charge coupled device (CCD) or a complementary metal-oxide semiconductor (CMOS) device have large storage capacities in digital systems. As the storage capacity is increased, demands for high optical performance and miniaturization for convenience in use with respect to a lens system that is employed in the photographing/image pick-up device also increase.

In order to clearly record small pieces of information of an object, a lens system must be able to favorably compensate for even an aberration generated around an image. However, in order to realize a high performance, miniaturization of a lens system is difficult, and the miniaturization accompanies high manufacturing costs. Therefore, it is difficult to satisfy both a high optical performance such as a high magnification and high-resolution and low manufacturing costs at the same time.

SUMMARY

One or more exemplary embodiments provide a zoom lens system that includes two lens groups.

According to an aspect of an exemplary embodiment, there is provided a zoom lens system including, in an order from an object side to an image side: a first lens group comprising at least one lens and having a negative refractive power; and a second lens group comprising at least one lens and having a positive refractive power, wherein the zoom lens system is configured to perform zooming by changing a distance between the first lens group and the second lens group and satisfies the following conditions:

$2 < |f1/fw| < 2.5$, and $0.60 < |f1/f2| < 0.85$, where f1 indicates a synthetic focal length of the first lens group, fw indicates an overall focal length at a wide angle end, and f2 indicates a synthetic focal length of the second lens group.

A total length of the zoom lens system may satisfy the following condition:

$Tw/D < 13.5$, wherein Tw indicates a total length of the zoom lens system at the wide angle end, and D indicates a diagonal length of an image surface passing a center of the image surface.

A lens disposed in the second closest to the object side among the at least one lens of the first lens group satisfies the following condition:

$Vd12 < 55$, wherein, Vd12 indicates an Abbe number at a d line of the lens disposed second closest to the object side among the at least one lens of the first lens group.

A lens disposed third closest to the object side among the at least one lens of the first lens group may satisfy the following condition:

$Nd13 > 1.90$, wherein Nd13 indicates a refractive index at a d line of the lens disposed third closest to the object side among the at least one lens of the first lens group.

Lenses disposed second and third closest to the object side among the at least one lens of the first lens group may form a cemented lens.

A lens disposed first closest to the object side among the at least one lens of the second lens group satisfies the following condition:

$Vd24 > 60$, wherein Vd24 indicates an Abbe number at a d line of the lens disposed first closest to the object side among the lenses of the second lens group.

Lenses disposed third and fourth closest to the object side among the at least one lens of the second lens group may satisfy the following conditions:

$Vd26 < 35$, and $Vd27 > 75$, wherein Vd26 indicates an Abbe number at a d line of a lens disposed third closest to the object side among the at least one lens of the second lens group, and Vd27 indicates an Abbe number at the d line of a lens disposed fourth closest to the object side among the at least one lens of the second lens group.

The lenses disposed closest to the object side among the lenses of the second lens group may form a cemented lens.

The number of lenses included in the first lens group may be three.

The first lens group may include a negative lens, a negative lens, and a positive lens in the order from the object side to the image side.

The second lens group may include a positive lens, a positive lens, a negative lens, a positive lens, and a positive lens in the order from the object side to the image side.

The lens disposed closest to the object side among the at least one lens of the second lens group may include at least one aspherical surface.

The lens disposed closest to the image side among the at least one lens of the second lens group may include at least one aspherical surface.

The zoom lens system may further include an aperture disposed between the first lens group and the second lens group, and a near infrared ray blocking filter disposed adjacent to or on a surface of the aperture adjacent the image side surface.

According to an aspect of another an exemplary embodiment, there is provided a zoom lens system including: a first lens group comprising at least one lens and having a negative refractive power; and a second lens group comprising at least one lens and having a positive refractive power, wherein the zoom lens system is configured to perform zooming by changing a distance between the first lens group and the second lens group, and satisfies the following conditions:

$2 < |f1/fw| < 2.5$, and $2.8 < |f2/fw| < 3.2$, wherein f1 indicates a synthetic focal length of the first lens group, fw indicates an overall focal length at a wide angle end, and f2 indicates a synthetic focal length of the second lens group.

The zoom lens system may satisfy the following condition:

$$0.60<|f1/f2|<0.85$$

A total length of the zoom lens system may satisfy the following condition:

$$Tw/D<13.5,$$

wherein Tw indicates an overall length of the zoom lens system at a wide angle end, and D indicates a diagonal length of an image surface passing a center of the image surface.

Lenses disposed second and third closest to the object side among at least one lens of the first lens group may form a cemented lens, and the lenses satisfy:

$$Vd12<55, \text{ and}$$

$$Nd13>1.90,$$

wherein Vd12 indicates an Abbe number at a d line of a lens disposed second closest to the object side of the first lens group, and Nd13 indicates a refractive index at a d line of a lens disposed third closest to the object side of the first lens group.

A lens disposed closest to the object side among the at least one lens of the second lens group may satisfy:

$$Vd24>60,$$

wherein Vd24 indicates an Abbe number at a d line of the lens disposed closest to the object side among the at least one lens of the second lens group.

Lenses disposed third and fourth closest to the object side among the at least one lens of the second lens group may satisfy:

$$Vd26<35, \text{ and}$$

$$Vd27>75,$$

wherein Vd26 indicates an Abbe number at a d line of the lens disposed third closest to the object side among the at least one lens of the second lens group, and Vd27 indicates an Abbe number at the d line of the lens disposed fourth closest to the object side among the at least one lens of the second lens group.

The zoom lens system according to exemplary embodiments of the inventive concept may miniaturize a size of the zoom lens system, may realize a high resolution, and may correct an aberration from a visible light region to a near infrared ray region. Accordingly, a high resolution photographing/image pickup device may be realized without changing an internal structure of the photographing/pickup device, and the photographing/image pickup may be readily performed in a daytime and a night time.

BRIEF DESCRIPTION OF THE DRAWINGS

The above and other aspects will become more apparent by describing in detail exemplary embodiments with reference to the attached drawings, in which:

FIG. 5A shows a longitudinal spherical aberration, an astigmatism, and distortion at the wide angle end of the zoom lens system of FIG. 4A, according to an exemplary embodiment;

FIG. 5B shows a longitudinal spherical aberration, an astigmatism, and distortion at the tele end of the zoom lens system of FIG. 4B, according to an exemplary embodiment;

DETAILED DESCRIPTION OF THE EXEMPLARY EMBODIMENTS

Figure 1:
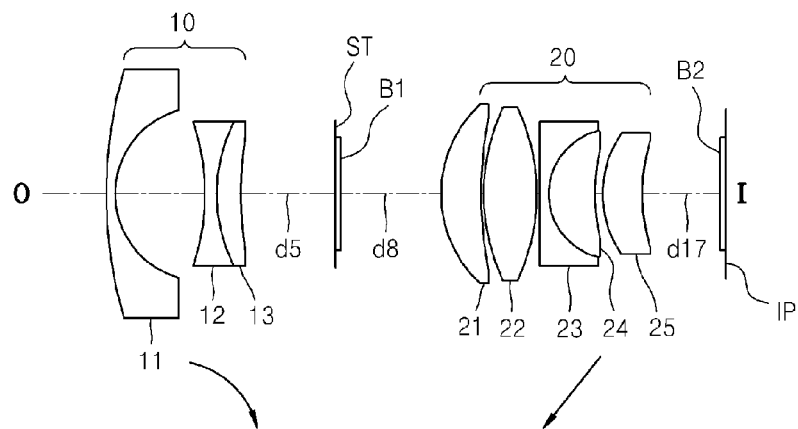
FIG. 1 is a zoom lens system according to an exemplary embodiment.

While exemplary embodiments of the present inventive concept are capable of various modifications and alternative forms, these embodiments are shown by way of example in the drawings and will herein be described in detail. It should be understood, however, that there is no intent to limit the embodiments to the particular forms disclosed, but on the contrary, these embodiments are to cover all modifications, equivalents, and alternatives falling within the scope of the inventive concept. In describing the inventive concept, when practical descriptions with respect to related known functions and configurations may unnecessarily make the scope of the inventive concept unclear, the descriptions thereof will be omitted. It will be understood that, although the terms 'first', 'second', etc. may be used herein to describe various elements, these elements should not be limited by these terms. These terms are only used to distinguish one element from another. The terminologies used herein are for the purpose of describing the embodiments only and are not intended to be limiting of the embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Also, it should be understood that a symbol "/" used below may be interpreted as "and or "or" according to circumstances.

FIG. 1 is a zoom lens system according to an exemplary embodiment.

Referring to FIG. 1, the zoom lens system includes a first lens group 10 that has a negative refractive index and a second lens group 20 that has a positive refractive index in the order from an object side O to an image side I. An aperture ST may be disposed between the first lens group 10 and the second lens group 20, and a first optical block B1 that corresponds to an optical filter may be disposed adjacent to or on a surface of the aperture ST facing the image side I. A second optical block B2 such as a cover glass that protects an image surface IP may be disposed adjacent to or on the image surface IP. Further, the second optical block B2 may be disposed to face the second lens group.

The zoom lens system according to the current embodiment may be applied to photographing devices such as a surveillance camera, a still camera, or a video camera. The photographing devices include a solid image pickup device, such as a charge coupled device (CCD) or a complementary metal-oxide semiconductor (CMOS) device. An image pickup surface of the solid image pickup device is disposed on the image surface IP of the zoom lens system according to the current embodiment, and light incident from the object side O of the zoom lens system forms an image on the solid image pickup device when the light finally reaches the image surface IP.

When the zoom lens system is applied to a surveillance camera, a first optical filter, corresponding to the first optical block B1, disposed adjacent to or on the image side surface of the aperture ST may include a near-infrared ray blocking filter or/and a dummy filter. The zoom lens system according to the current embodiment may form an image by receiving light in a range from a visible light band to a near-infrared ray band. Here, at daytime, the near-infrared ray blocking filter is disposed adjacent to or on the image side surface of the aperture ST to form an image by receiving light in a visible light band, and at night time, the dummy filter is disposed adjacent to or on the image side surface of the aperture ST to form an image by receiving light in a near-infrared ray band.

The zoom lens system may perform zooming by changing a distance between the first lens group 10 and the second lens group 20. To perform zooming from a wide angle end to a tele end, both the first lens group 10 and the second lens group 20 may be moved. The second lens group 20 may move along a straight line track as shown in an arrow direction of FIG. 1 to perform zooming, and the first lens group 10 may move along a parabolic track as shown in the arrow direction of FIG. 1 to perform zooming.

The zoom lens system according to the current embodiment may satisfy the following conditions.

$$2 < |f1/fw| < 2.5,$$  <Condition 1> where f1 indicates a synthetic focal length of the first lens group 10, and fw indicates an overall focal length at a wide angle end.

The condition 1 defines a ratio of a synthetic focal length of the first lens group 10 with respect to an overall focal length at a wide angle end, and thus, control of an aberration in a peripheral region on an image and miniaturization of an optical system may be performed through the condition 1. When this ratio has a value smaller than the lowermost limit which is 2, the aberration in a peripheral region may occur, and when this ratio has a value greater than the uppermost limit which is 2.5, it may be difficult to achieve a wide angle of the zoom lens system and to realize miniaturization of the zoom lens system due to increase in an effective diameter of the first lens group 10.

$$0.60 < |f1/f2| < 0.85,$$  <Conditional 2> where f1 indicates a synthetic focal length of the first lens group 10, and f2 indicates a synthetic focal length of the second lens group 20.

The condition 2 defines a ratio of a synthetic focal length of the first lens group 10 with respect to a synthetic focal length of the second lens group 20. When this ratio has a value smaller than the lowermost limit which is 0.60, a moving distance of the second lens group 20 increases when zooming is performed since a refractive power of the second lens group 20 is decreased. Accordingly, a total length of the zoom lens system is increased, and thus, miniaturization of the zoom lens system is difficult. When this ratio has a value greater than the uppermost limit which is 0.85, the refractive power of the second lens group 20 is increased, and thus, aberration correction is difficult.

Meanwhile, the condition 2 defines distribution of a refractive power of the first lens group 10 and the second lens group 20. Miniaturization of the zoom lens system may be realized through the condition 2, and a space for adjacently disposing the first optical block B1 to the image side surface of the aperture ST may be sufficiently provided.

$$2.8 < |f2/fw| < 3.2$$  <Condition 3>

The condition 3 defines a ratio of a synthetic focal length of the second lens group 20 with respect to the overall focal length at the wide angle end. When this ratio has a value smaller than the lowermost limit which is 2.8, the refractive power of the second lens group 20 is increased, and thus, the aberration correction is difficult. When this ratio has a value greater than the uppermost limit which is 3.2, the refractive power of the second lens group 20 is decreased, and thus, the moving distance of the second lens group 20 is increased when zooming is performed.

$$Tw/D < 13.5,$$  <Condition 4> where Tw indicates a total length of the zoom lens system at the wide angle end, and D indicates a length of a diagonal of the image surface IP that passes a center of the image surface IP.

The condition 4 defines a ratio of the total length of the zoom lens system at the wide angle end with respect to an opposite angle of the image surface IP. Although a size of an image pickup surface, that is, the image surface IP of a solid image pickup device is increased according to a demand for a high pixel, a zoom lens system that can maintain a short total length of the zoom lens system may be provided.

The first lens group 10 includes three lenses to make the first lens group 10 smaller and lighter. All lenses that constitute the first lens group 10 may be spherical lenses. Since the first lens group 10 includes these spherical lenses, a low cost zoom lens system may be realized. At the same time, a high quality lens group may be realized through the conditions described above. The first lens group 10 may include a first lens 11 having a negative refractive power, a second lens 12 having a negative refractive power, and a third lens 13 having a positive refractive power. The second lens 12 and the third lens 13 may constitute a cemented lens, and the cemented lens may compensate for a chromatic aberration at the tele end.

Each of the second lens 12 and the third lens 13 may satisfy the following condition 5.

Vd12<55,   <Condition 5> where Vd12 indicates an Abbe number at a d line of a lens that is disposed second closest to the object side O among the lenses of the first lens group 10, that is, the second lens 12.

Nd13>1.90,   <Condition 6> where Nd13 indicates a refractive index at the d line of a lens that is disposed third closest to the object side O among the lenses of the first lens group 10, that is, the third lens 13.

The condition 5 defines the Abbe number of the second lens 12 at the d line, and the condition 6 defines the refractive index of the third lens 13 at the d line. When the condition 5 has a value greater than the uppermost limit which is 55, a chromatic aberration may occur at a tele end, and when the condition 6 has a value smaller than the lowermost limit which is 1.90, a curvature of the third lens 13 may be rapidly increased, and thus, a spherical aberration may easily occur.

The second lens group 20 may include five lenses. The second lens group 20 may include a fourth lens 21 having a positive refractive power, a fifth lens 22 having a positive refractive power, a sixth lens 23 having a negative refractive power, a seventh lens 24 having a positive refractive power, and an eighth lens 25 having a positive refractive power in the order from the object side O to an image side I.

The second lens group 20 may correct an aberration by including at least one aspherical surface. For example, the lens that is disposed closest to the object side O among the lenses of the second lens group 20, that is, the fourth lens 21 may include at least one aspherical surface. Since the fourth lens 21 includes an aspherical surface, the fourth lens 21 may correct the spherical aberration. The lens of the second lens group 20 disposed closest to the image side I, that is, the eighth lens 25 may include at least one aspherical surface. Since the eighth lens 25 having a positive refractive power includes an aspherical surface, a comatic aberration (coma) that may occur in a peripheral region of an image may be corrected.

The sixth lens 23 and the seventh lens 24 of the second lens group 20 may form a cemented lens. The cemented lens of the sixth lens 23 and the seventh lens 24 may correct a chromatic aberration at a near infrared ray region.

The second lens group 20 may satisfy following conditions 7 to 9.

Vd24>60,   <Condition 7> where Vd24 indicates an Abbe number at a d line of a lens that is disposed closest to the object side O among the lenses of the second lens group 20, that is, the fourth lens 21.

The condition 7 defines an Abbe number at the d line of the fourth lens 21. When the condition 7 has a value smaller than the lowermost limit, an axial chromatic aberration may occur, and thus, it is difficult to correct chromatic aberration at the near infrared ray region.

Vd26<35   <Condition 8>

Vd27>75,   <Condition 9> where Vd26 indicates an Abbe number at the d line of a lens that is disposed third closest to the object side O among the lenses of the second lens group 20, that is, the sixth lens 23, and Vd27 indicates an Abbe number at the d line of a lens disposed fourth closest to the object side O among the lenses of the second lens group 20, that is, the seventh lens 24.

The condition 8 defines an Abbe number at the d line of the sixth lens 23, and the condition 9 defines an Abbe number at the d line of the seventh lens 24. When the condition 8 and the condition 9 are beyond the limits which are 35 and 75, respectively, the chromatic aberration correction effect of the cemented lens of the sixth lens 23 and the seventh lens 24 may be decrease, and as a result, a chromatic aberration may occur at the near infrared ray region.

The zoom lens system described above may realize a high resolution and may correct a chromatic aberration from a visible light region to a near infrared ray region while reducing the size of the zoom lens system. Thus, a high resolution image pickup device may be realized and images may be readily taken at a day time and a night time without modifying an internal structure of the image pickup device.

The definition of the aspherical surface described in the current embodiment may be as follows.

The shape of the aspherical surface of the zoom lens system according to the current embodiment may be expressed as the following Equation by defining a moving direction of light as positive when a direction of an optical axis is an x axis and a direction perpendicular to the direction of the optical axis is a y axis. Here, x indicates a distance in an optical axis direction from a vertex of a lens, y indicates a distance in a direction perpendicular to the optical axis direction, k is a conic constant, A, B, C, and D are coefficients of aspherical surfaces, and c is a reverse number (1/R) of a radius of curvature at a vertex of a lens.

$$x = \frac{cy^2}{1+\sqrt{1-(k+1)c^2y^2}} + Ay^4 + By^6 + Cy^8 \quad \text{\langle Equation\rangle}$$

Hereinafter, f indicates a focal length, fno indicates an F number, Rn indicates a radius of curvature, Dn indicates a thickness at the center of a lens or a distance between lenses (on an optical axis), nd indicates a refractive index at a d line, vd indicates Abbe number at the d line, ASP indicates aspherical surfaces, and ST indicates a surface of an aperture.

<First Embodiment>

Figure 2A:
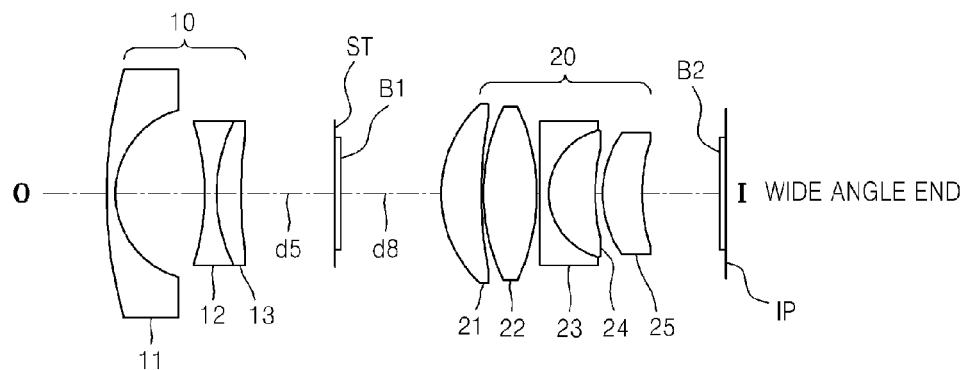
FIGS. 2A and 2B illustrate the zoom lens system of FIG. 1 at the wide angle end and the tele end, respectively, according to a first embodiment.
Figure 2B:
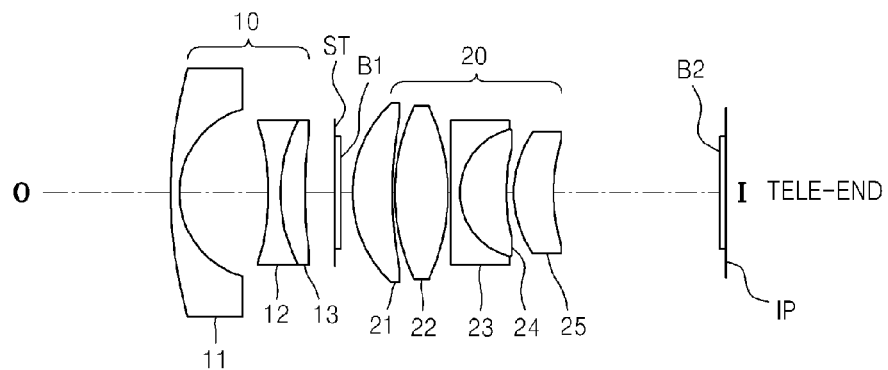

FIGS. 2A and 2B illustrate the zoom lens system of FIG. 1 at the wide angle end and the tele end, respectively, according to a first embodiment. FIGS. 2A and 2B show a configuration of the zoom lens system at the wide angle end and the tele end, respectively, based on design data according to the first embodiment. Table 1 summarizes the design data of the zoom lens system according to the first embodiment depicted in FIGS. 2A and 2B.

TABLE 1

| surface no. | Rn | Dn | nd | vd |
|---|---|---|---|---|
| 1 | 38.044 | 0.75 | 1.910822 | 35.25 |
| 2 | 6.876 | 6.98 | | |
| 3 | −19.67 | 0.89 | 1.6131 | 44.3607 |
| 4 | 11.335 | 2.12 | 1.945945 | 17.9843 |
| 5 | 49.006 | d5 | | |
| 6 (STO) | Infinity | 0 | | |
| 7 | Infinity | 0.145 | 1.523 | 57.2 |
| 8 | Infinity | d8 | | |
| 9 (ASP) | 9.485 | 3.13 | 1.618806 | 63.8554 |
| 10 (ASP) | 134.619 | 0.15 | | |
| 11 | 15.933 | 4.18 | 1.496997 | 81.6084 |
| 12 | −15.933 | 0.2 | | |
| 13 | Infinity | 0.75 | 1.737999 | 32.2613 |
| 14 | 5.231 | 3.77 | 1.496997 | 81.6084 |
| 15 | 33.001 | 0.49 | | |
| 16 (ASP) | 9.014 | 3.37 | 1.618806 | 63.8554 |
| 17 (ASP) | 33.357 | d17 | | |
| 18 | Infinity | 0.4 | 1.51633 | 64.1 |

TABLE 1-continued

| surface no. | Rn | Dn | nd | vd |
|---|---|---|---|---|
| 19 | Infinity | 0.125 | | |
| 20 | Infinity | 0 | | |

Table 2 illustrates aspherical surface coefficients of the zoom lens system depicted in FIGS. 2A and 2B, and Table 3 illustrates focal lengths, F numbers, angles of view, and variable distances.

TABLE 2

| surface no. | k | A | b | c | d |
|---|---|---|---|---|---|
| 9 | 0 | −3.12E−05 | −9.26E−07 | 2.36E−08 | −4.59E−10 |
| 10 | 0 | 2.73E−04 | 1.26E−06 | 0.00E+00 | 0.00E+00 |
| 16 | 0 | 1.47E−04 | −2.93E−06 | 1.46E−07 | 0.00E+00 |
| 17 | 0 | 4.84E−04 | −6.55E−06 | 2.87E−07 | 0.00E+00 |

TABLE 3

| variable end | f | Fno | FOV | d5 | d8 | d17 |
|---|---|---|---|---|---|---|
| wide angle end | 3.380 | 1.255 | 75.401 | 7.423 | 8.131 | 5.775 |
| tele end | 8.340 | 2.372 | 26.004 | 2.378 | 0.601 | 13.305 |

Figure 3A:
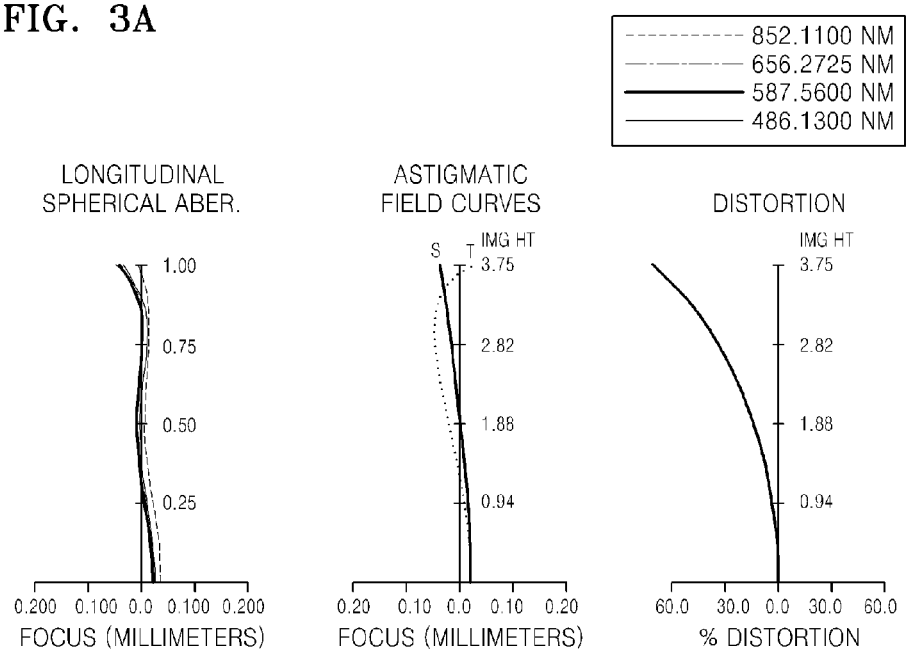
FIG. 3A shows a longitudinal spherical aberration, an astigmatism, and distortion at the wide angle end of the zoom lens system of FIG. 2A, according to an exemplary embodiment.
Figure 3B:
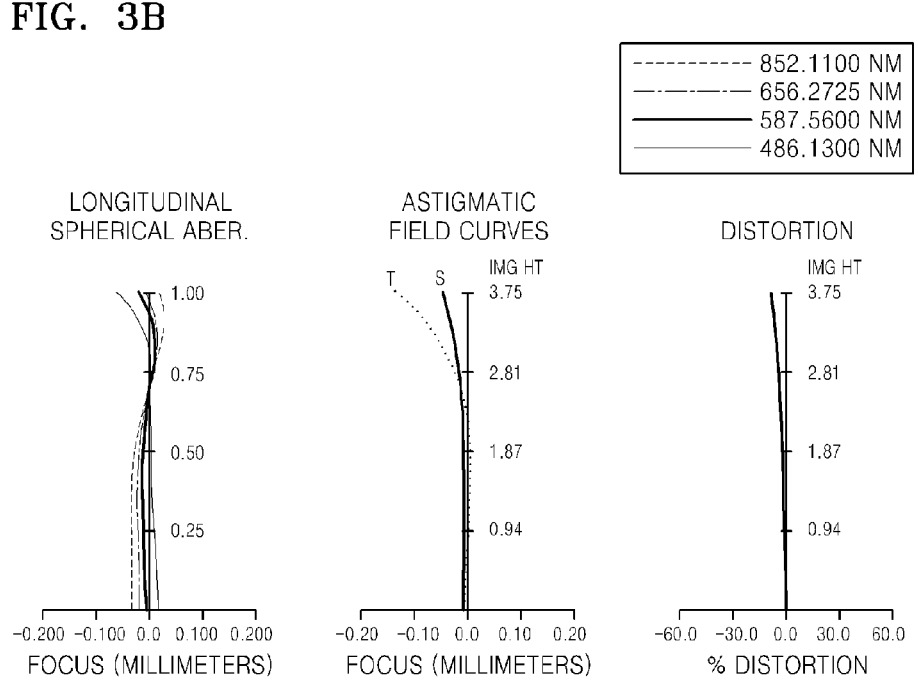
FIG. 3B shows a longitudinal spherical aberration, an astigmatism, and distortion at the tele end of the zoom lens system of FIG. 2B, according to an exemplary embodiment.

FIGS. 3A and 3B are aberration graphs at the wide angle end and the tele end of the zoom lens system of FIGS. 2A and 2B, respectively. FIG. 3A shows a longitudinal spherical aberration, an astigmatism (astigmatism field curve), and distortion at the wide angle end. FIG. 3B shows a longitudinal spherical aberration, an astigmatism (astigmatism field curve), and distortion at the tele end. The longitudinal spherical aberration is depicted with respect to light having wavelengths of approximately 852.1100 nm (s line), 656.2725 nm (c line), 587.5600 nm (d line), and 486.1300 (f line), and the astigmatism and the distortion are depicted with respect to light having a wavelength of 587.56 nm (d line). In the astigmatism curve, a dotted line indicates tangential astigmatism and a solid line indicates sagittal astigmatism.

<Second Embodiment<

Figure 4A:
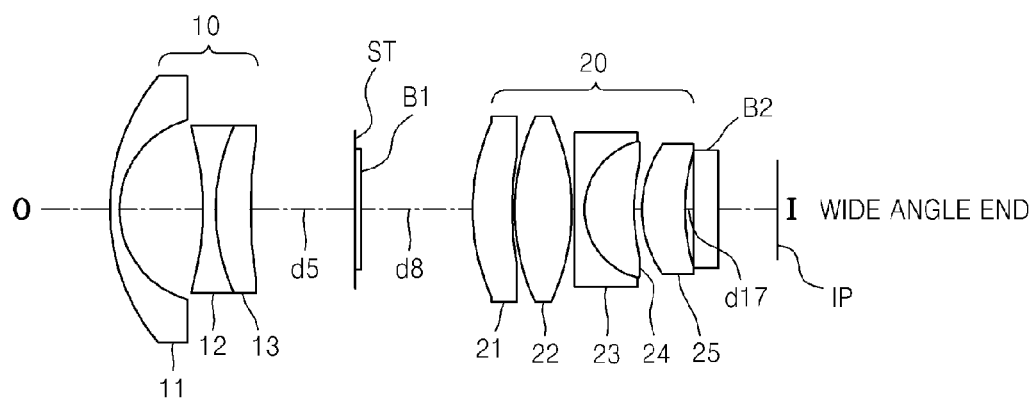
FIGS. 4A and 4B show the zoom lens system of FIG. 1 at the wide angle end and the tele end, respectively, according to a second embodiment.
Figure 4B:
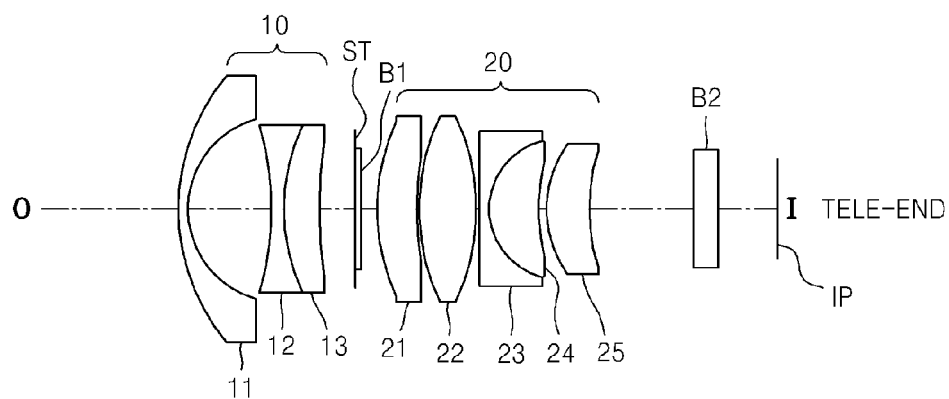

FIGS. 4A and 4B show a configuration of the zoom lens system of FIG. 1 at the wide angle end and the tele end based on design data according to the second embodiment. Table 4 summarizes the design data of the zoom lens system according to the second embodiment depicted in FIGS. 4A and 4B.

TABLE 4

| surface no. | r | d | nd | vd |
|---|---|---|---|---|
| 1 | 21.38236 | 0.75 | 1.903658 | 31.315 |
| 2 | 6.713117 | 6.765298 | | |
| 3 | −16.7768 | 0.75 | 1.654115 | 39.6828 |
| 4 | 11.13509 | 2.9 | 1.945945 | 17.9843 |
| 5 | 78.201 | d5 | | |
| 6 (STO) | 1.00E+18 | 0 | | |
| 7 | 1.00E+18 | 0.175 | 1.523 | 57.2 |
| 8 | 1.00E+18 | d8 | | |
| 9 (ASP) | 11.08486 | 3 | 1.618806 | 63.8554 |
| 10 (ASP) | 44.09568 | 0.2 | | |
| 11 | 10.81162 | 4.540243 | 1.437001 | 95.1004 |
| 12 | −16.9822 | 0.2 | | |
| 13 | 2.06E+01 | 0.75 | 1.799999 | 29.8447 |
| 14 | 5.391718 | 3.2 | 1.496997 | 81.6084 |
| 15 | 10.95526 | 0.242248 | | |

TABLE 4-continued

| surface no. | r | d | nd | vd |
|---|---|---|---|---|
| 16 (ASP) | 5.880442 | 3.43091 | 1.618806 | 63.8554 |
| 17 (ASP) | 14.53607 | d17 | | |
| 18 | 1.00E+18 | 2 | 1.51633 | 64.1 |
| 19 | 1.00E+18 | 3.578855 | | |
| 20 | 1.00E+18 | 0 | | |

Table 5 illustrates aspherical surface coefficients of the zoom lens system depicted in FIGS. 5A and 5B, and Table 6 illustrates focal lengths, F numbers, angles of view, and variable distances.

TABLE 5

| surface no. | k | a | b | c | d |
|---|---|---|---|---|---|
| 9 | 0 | −0.00019 | −5.18E−06 | −6.07E−09 | 0 |
| 10 | 0 | −2.34E−05 | −5.34E−06 | 4.03E−08 | 0 |
| 16 | 0 | −1.89E−04 | −8.61E−06 | −2.94E−07 | 0 |
| 17 | 0 | 8.35E−04 | −5.76E−06 | 2.22E−07 | 0 |

TABLE 6

| variable end | f | Fno | FOV | d5 | d8 | d17 |
|---|---|---|---|---|---|---|
| wide angle end | 3.380 | 1.242 | 68.731 | 8.682 | 7.114 | 0.716 |
| tele end | 8.350 | 2.180 | 25.374 | 1.919 | 0.800 | 7.048 |

FIGS. 5A and 5B respectively show aberration graphs at the wide angle end and the tele end of the zoom lens system of FIGS. 4A and 4B. FIG. 5A shows a longitudinal spherical aberration, an astigmatism (astigmatism field curve), and distortion at the wide angle end. FIG. 5B shows a longitudinal spherical aberration, an astigmatism (astigmatism field curve), and distortion at the tele end. The longitudinal spherical aberration is depicted with respect to light having wavelengths of approximately 852.1100 nm (s line), 656.2725 nm (c line), 587.5600 nm (d line), and 486.1300 (f line), and the astigmatism and the distortion are depicted with respect to light having a wavelength of 587.56 nm (d line). In the astigmatism curve, a dotted line indicates tangential astigmatism and a solid line indicates sagittal astigmatism.

<Third Embodiment<

Figure 6A:
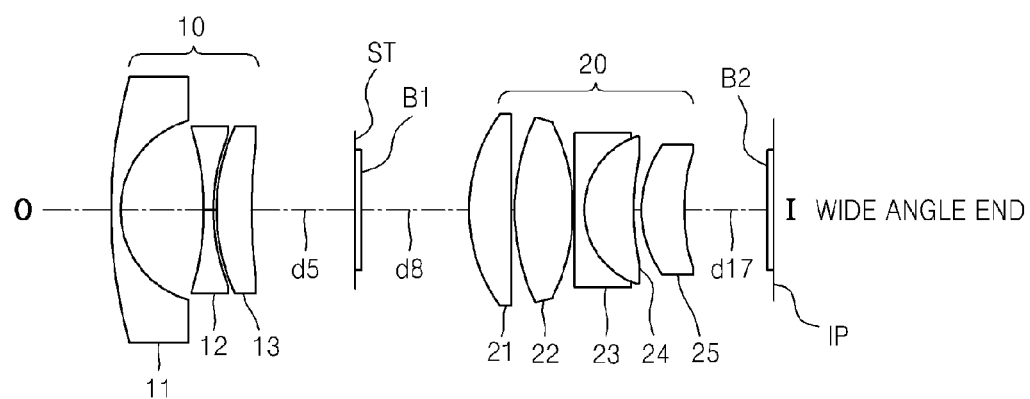
FIGS. 6A and 6B show the zoom lens system of FIG. 1 at the wide angle end and the tele end, respectively, according to a third embodiment.
Figure 6B:
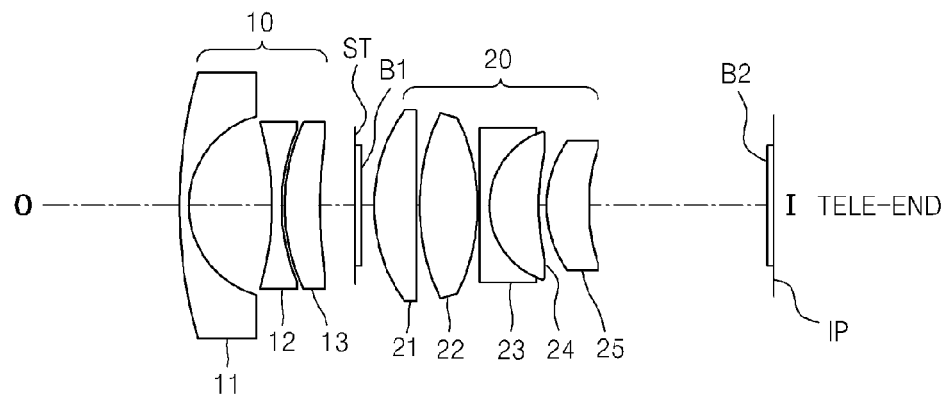

FIGS. 6A and 6B show a configuration of the zoom lens system of FIG. 1 based on design data according to the third embodiment. Table 7 summarizes the design data of the zoom lens system according to the third embodiment depicted in FIGS. 6A and 6B.

TABLE 7

| surface no. | r | d | nd | vd |
|---|---|---|---|---|
| 1 | 35.828 | 0.750 | 1.910822 | 35.25 |
| 2 | 6.628 | 5.500 | | |
| 3 | −14.405 | 0.768 | 61.31 | 44.3607 |
| 4 | 16.322 | 0.150 | | |
| 5 | 15.087 | 2.810 | 94.5945 | 17.9843 |
| 6 | 171.311 | d6 | | |
| 7 (STO) | Infinity | 0.000 | | |
| 8 | Infinity | 0.145 | 1.523 | 57.2 |
| 9 | Infinity | d9 | | |
| 10 (ASP) | 10.175 | 3.083 | 1.618806 | 63.8554 |
| 11 (ASP) | 206.302 | 0.150 | | |
| 12 | 13.592 | 4.012 | 1.496997 | 81.6084 |
| 13 | −23.422 | 0.232 | | |

TABLE 7-continued

| surface no. | r | d | nd | vd |
|---|---|---|---|---|
| 14 | 435.152 | 0.750 | 1.737999 | 32.2613 |
| 15 | 5.611 | 3.774 | 1.496997 | 81.6084 |
| 16 | 36.687 | 1.034 | | |
| 17 (ASP) | 9.014 | 3.357 | 1.618806 | 63.8554 |
| 18 (ASP) | 38.325 | d18 | | |
| 19 | Infinity | 0.400 | 1.51633 | 64.1 |
| 20 | Infinity | 0.125 | | |
| 21 | Infinity | 0.000 | | |

Table 8 illustrates aspherical surface coefficients of the zoom lens system depicted in FIGS. 6A and 6B, and Table 9 illustrates focal lengths, F numbers, angles of view, and variable distances.

TABLE 8

| surface no. | k | a | b | c | d |
|---|---|---|---|---|---|
| 10 | −3.29E−01 | −0.00011 | −7.61E−07 | 1.47E−08 | −1.13E−09 |
| 11 | 9.14E+02 | 5.86E−21 | 8.32E−07 | −3.38E−08 | −7.23E−10 |
| 17 | −6.90E−01 | −2.33E−05 | −1.73E−07 | −1.69E−08 | 0.00E+00 |
| 18 | −5.73E+01 | 3.57E−04 | −4.42E−06 | 3.85E−08 | 0.00E+00 |

TABLE 9

| variable end | f | Fno | FOV | d6 | d9 | d18 |
|---|---|---|---|---|---|---|
| wide angle end | 3.383 | 1.263 | 75.446 | 7.713 | 8.272 | 5.775 |
| tele end | 8.351 | 2.361 | 26.102 | 2.393 | 0.600 | 13.461 |

Figure 7A:
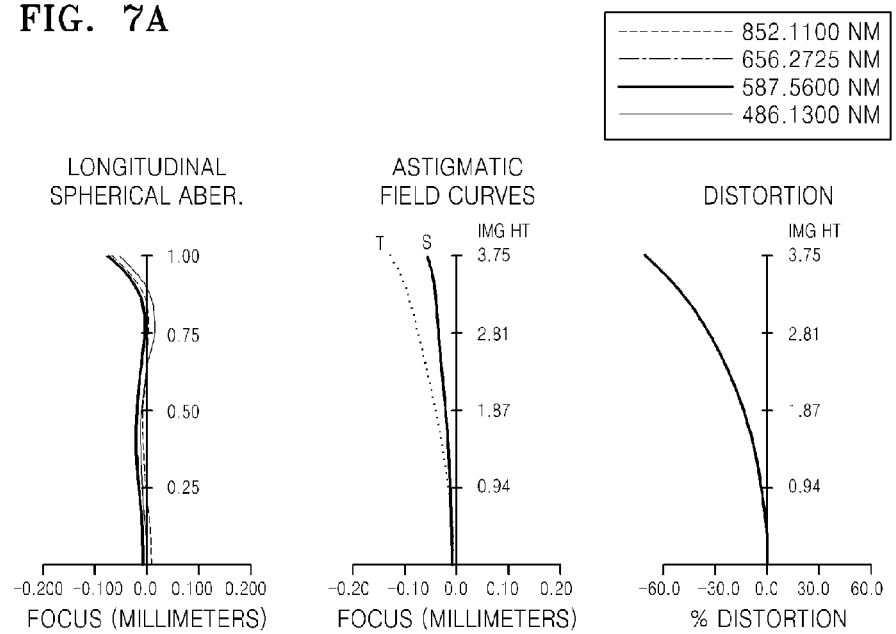
FIG. 7A shows a longitudinal spherical aberration, an astigmatism, and distortion at the wide angle end of the zoom lens system of FIG. 6A, according to an exemplary embodiment.
Figure 7B:
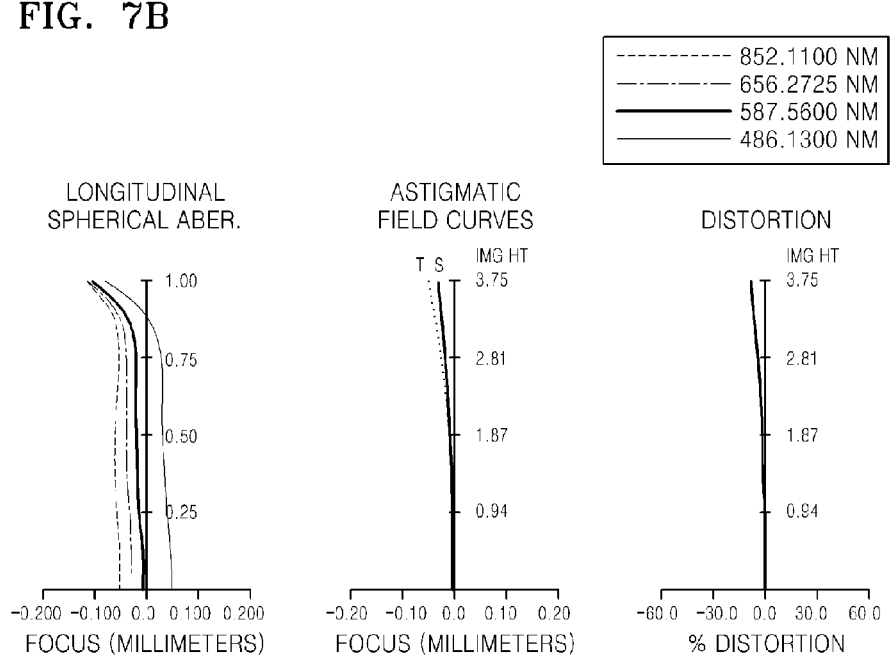
FIG. 7B shows a longitudinal spherical aberration, an astigmatism, and distortion at the tele end of the zoom lens system of FIG. 6B, according to an exemplary embodiment.

FIGS. 7A and 7B respectively show aberration graphs at the wide angle end and the tele end of the zoom lens system of FIGS. 6A and 6B. FIG. 7A shows a longitudinal spherical aberration, an astigmatism (astigmatism field curve), and distortion at the wide angle end. FIG. 7B shows a longitudinal spherical aberration, an astigmatism (astigmatism field curve), and distortion at the tele end. The longitudinal spherical aberration is depicted with respect to light having wavelengths of approximately 852.1100 nm (s line), 656.2725 nm (c line), 587.5600 nm (d line), and 486.1300 (f line), and the astigmatism and the distortion are depicted with respect to light having a wavelength of 587.56 nm (d line). In the astigmatism curve, a dotted line indicates tangential astigmatism and a solid line indicates sagittal astigmatism.

<Fourth Embodiment>

Figure 8A:
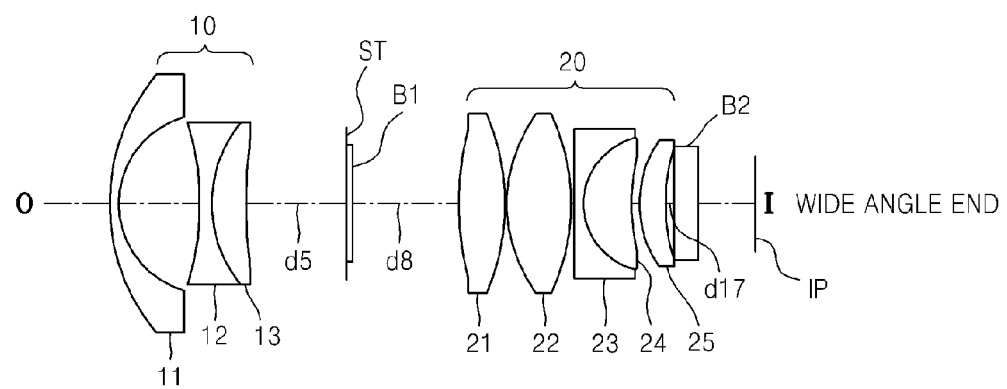
FIGS. 8A and 8B show the zoom lens system of FIG. 1 at the wide angle end and the tele end, respectively, according to a fourth embodiment.
Figure 8B:
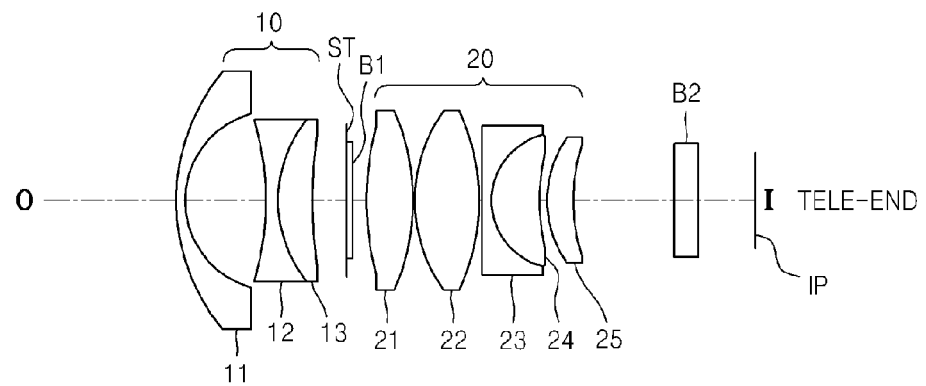

FIGS. 8A and 8B show a configuration of the zoom lens system of FIG. 1 based on design data according to the fourth embodiment. Table 10 summarizes the design data of the zoom lens system according to the fourth embodiment depicted in FIGS. 8A and 8B.

TABLE 10

| surface no. | r | d | nd | vd |
|---|---|---|---|---|
| 1 | 18.745 | 0.750 | 1.903658 | 31.315 |
| 2 | 6.697 | 6.783 | | |
| 3 | −17.667 | 0.750 | 1.658436 | 50.8546 |
| 4 | 10.386 | 2.900 | 1.92286 | 20.8804 |
| 5 | 65.713 | d5 | | |
| 6 (STO) | Infinity | 0.000 | | |
| 7 | Infinity | 0.175 | 1.523 | 57.2 |
| 8 | Infinity | d8 | | |
| 9 (ASP) | 13.000 | 3.000 | 1.497103 | 81.5596 |
| 10 (ASP) | −36.421 | 0.200 | | |

TABLE 10-continued

| surface no. | r | d | nd | vd |
|---|---|---|---|---|
| 11 | 9.923 | 5.049 | 1.437001 | 95.1004 |
| 12 | −16.930 | 0.200 | | |
| 13 | 32.537 | 0.750 | 1.737999 | 32.2613 |
| 14 | 4.897 | 3.200 | 1.496997 | 81.6084 |
| 15 | 10.711 | 0.513 | | |
| 16 (ASP) | 6.631 | 2.057 | 1.72903 | 54.0413 |
| 17 (ASP) | 14.716 | d17 | | |
| 18 | Infinity | 2.000 | 1.51633 | 64.1 |
| 19 | Infinity | 3.600 | | |
| 20 | Infinity | 0.000 | | |

Table 11 illustrates aspherical surface coefficients of the zoom lens system depicted in FIGS. 8A and 8B, and Table 12 illustrates focal lengths, F numbers, angles of view, and variable ranges.

TABLE 11

| surface no. | k | a | b | c | d |
|---|---|---|---|---|---|
| 9 | 0 | −2.17E−04 | −6.19E−06 | −2.65E−08 | 0 |
| 10 | 0 | 6.82E−06 | −6.12E−06 | 2.27E−08 | 0 |
| 16 | 0 | 1.88E−04 | −8.40E−06 | 0.00E+00 | 0 |
| 17 | 0 | 8.55E−04 | −9.65E−06 | 1.50E−07 | 0 |

TABLE 12

| variable end | f | Fno | FOV | d5 | d8 | d17 |
|---|---|---|---|---|---|---|
| wide angle end | 3.383 | 1.225 | 67.676 | 9.455 | 6.918 | 0.700 |
| tele end | 8.353 | 2.081 | 25.353 | 1.881 | 0.800 | 6.815 |

Figure 9A:
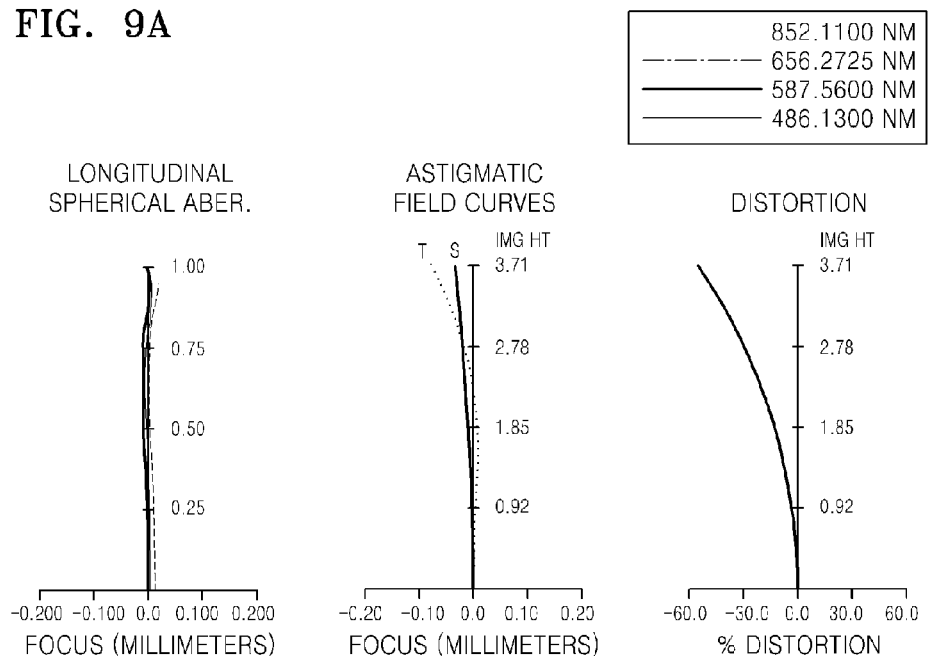
FIG. 9A shows a longitudinal spherical aberration, an astigmatism (astigmatism field curve), and distortion at the wide angle end of the zoom lens system of FIG. 8A, according to an exemplary embodiment.
Figure 9B:
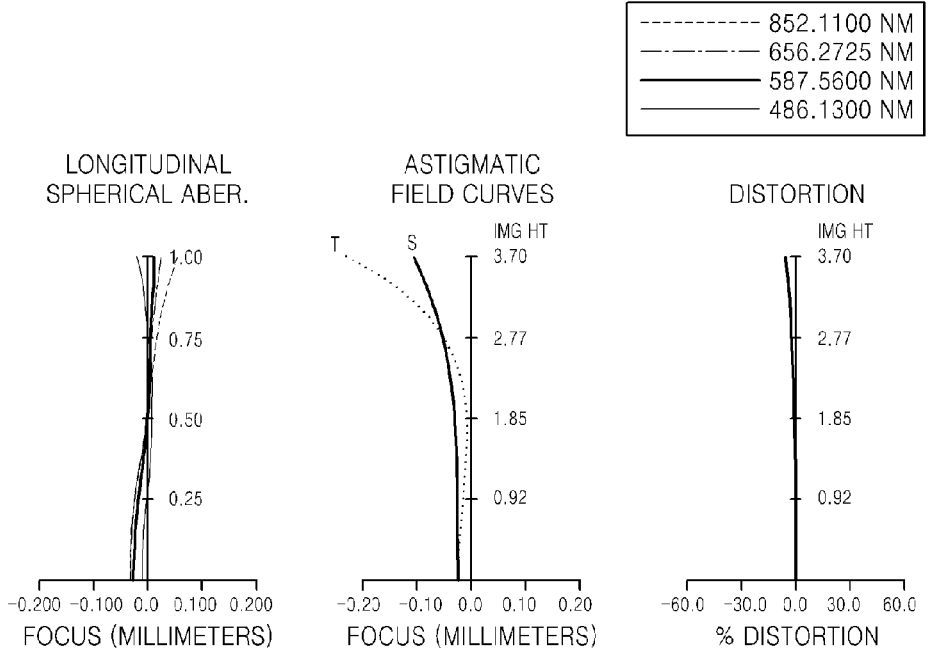
FIG. 9B shows a longitudinal spherical aberration, an astigmatism (astigmatism field curve), and distortion at the tele end of the zoom lens system of FIG. 8B, according to an exemplary embodiment.

FIGS. 9A and 9B respectively show aberration graphs at the wide angle end and the tele end of the zoom lens system of FIG. 1. FIG. 9A shows a longitudinal spherical aberration, an astigmatism (astigmatism field curve), and distortion at the wide angle end. FIG. 9B shows a longitudinal spherical aberration, an astigmatism (astigmatism field curve), and distortion at the tele end. The longitudinal spherical aberration is depicted with respect to light having wavelengths of approximately 852.1100 nm (s line), 656.2725 nm (c line), 587.5600 nm (d line), 486.1300 (f line), and the astigmatism and the distortion are depicted with respect to light having a wavelength of 587.56 nm (d line). In the astigmatism curve, a dotted line indicates tangential astigmatism and a solid line indicates sagittal astigmatism.

Tables 13 and 14 summarize values according to conditions in each of the embodiments

TABLE 13

| | conditions | | | |
|---|---|---|---|---|
| | condition 1 $2 < |f1/fw| <$ 2.5 | condition 2 $0.6 < |f1/ f2| < 0.85$ | condition 3 $2.8 < f2/fw <$ 3.2 | condition 4 Tw/D < 13.5 |
| 1$^{st}$ embodiment | 2.032 | 0.660 | 3.08 | 13.01 |
| 2$^{nd}$ embodiment | 2.260 | 0.786 | 2.88 | 13.24 |
| 3$^{rd}$ embodiment | 2.044 | 0.647 | 3.16 | 13.01 |
| 4$^{th}$ embodiment | 2.352 | 0.813 | 2.89 | 13.24 |

TABLE 14

| | conditions | | | | |
|---|---|---|---|---|---|
| | condition 5 Vd12 < 55 | condition 6 Nd13 > 1.90 | condition 7 Vd24 > 60 | condition 8 Vd26 < 35 | condition 9 Vd27 > 75 |
| 1$^{st}$ embodiment | 44.361 | 1.946 | 63.855 | 32.261 | 81.608 |
| 2$^{nd}$ embodiment | 39.683 | 1.946 | 63.855 | 29.845 | 81.608 |
| 3$^{rd}$ embodiment | 44.361 | 1.946 | 63.855 | 32.261 | 81.608 |
| 4$^{th}$ embodiment | 50.855 | 1.923 | 81.560 | 32.261 | 81.608 |

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A zoom lens system comprising, in an order from an object side to an image side:
    a first lens group comprising at least one lens and having a negative refractive power; and
    a second lens group comprising at least one lens and having a positive refractive power,
    wherein the zoom lens system is configured to perform zooming by changing a distance between the first lens group and the second lens group and satisfies:

$2<|f1/fw|<2.5$, and $0.60<|f1/f2|<0.85$, wherein f1 indicates a synthetic focal length of the first lens group, fw indicates an overall focal length at a wide angle end, and f2 indicates a synthetic focal length of the second lens group,
    wherein the zoom lens system has only two lens groups,
    wherein a number of lenses included in the first lens group is three.

2. The zoom lens system of claim 1, wherein a total length of the zoom lens system satisfies:

$Tw/D<13.5$, wherein Tw indicates the total length of the zoom lens system at the wide angle end, and D indicates a diagonal length of an image surface passing a center of the image surface.

3. The zoom lens system of claim 1, wherein a lens disposed second closest to the object side among the at least one lens of the first lens group satisfies:

Vd12<55, wherein Vd12 indicates an Abbe number at a d line of the lens disposed second closest to the object side among the at least one lens of the first lens group.

4. The zoom lens system of claim 1, wherein a lens disposed third closest to the object side among the at least one lens of the first lens group satisfies:

Nd13>1.90, wherein Nd13 indicates a refractive index at a d line of the lens disposed third closest to the object side among the at least one lens of the first lens group.

5. The zoom lens system of claim 1, wherein lenses disposed second and third closest to the object side among the at least one lens of the first lens group form a cemented lens.

6. The zoom lens system of claim 1, wherein a lens disposed first closest to the object side among the at least one lens of the second lens group satisfies:

Vd24>60, wherein Vd24 indicates an Abbe number at a d line of the lens disposed first closest to the object side among the lenses of the second lens group.

7. The zoom lens system of claim 1, wherein lenses disposed third and fourth closest to the object side among the at least one lens of the second lens group satisfy:

Vd26<35, and

Vd27>75, wherein Vd26 indicates an Abbe number at a d line of a lens disposed third closest to the object side among the at least one lens of the second lens group, and Vd27 indicates an Abbe number at the d line of a lens disposed fourth closest to the object side among the at least one lens of the second lens group.

8. The zoom lens system of claim 7, wherein the lenses disposed third and fourth closest to the object side among the lenses of the second lens group form a cemented lens.

9. The zoom lens system of claim 1, wherein the first lens group comprises a negative lens, a negative lens, and a positive lens in the order from the object side to the image side.

10. The zoom lens system of claim 1, wherein the second lens group comprises a positive lens, a positive lens, a negative lens, a positive lens, and a positive lens in the order from the object side to the image side.

11. The zoom lens system of claim 1, wherein a lens disposed closest to the object side among the at least one lens of the second lens group comprises at least one aspherical surface.

12. The zoom lens system of claim 1, wherein a lens disposed closest to the image side among the at least one lens of the second lens group comprises at least one aspherical surface.

13. The zoom lens system of claim 1, further comprising an aperture disposed between the first lens group and the second lens group, and a near infrared ray blocking filter disposed on or adjacent to a surface of the aperture facing the image side.

14. A zoom lens system comprising:
a first lens group comprising at least one lens and having a negative refractive power; and
a second lens group comprising at least one lens and having a positive refractive power,
wherein the zoom lens system is configured to perform zooming by changing a distance between the first lens group and the second lens group, and satisfies;

$2<|f1/fw|<2.5$, and $2.8<|f2/fw|<3.2$, wherein f1 indicates a synthetic focal length of the first lens group, fw indicates an overall focal length at a wide angle end, and f2 indicates a synthetic focal length of the second lens group,
wherein the zoom lens system has only two lens groups,
wherein a number of lenses included in the first lens group is three.

15. The zoom lens system of claim 14, wherein the zoom lens system satisfies:

$0.60<|f1/f2|<0.85$.

16. The zoom lens system of claim 14, wherein a total length of the zoom lens system satisfies:

$Tw/D<13.5$, wherein Tw indicates the total length of the zoom lens system at a wide angle end, and D indicates a diagonal length of an image surface passing a center of the image surface.

17. The zoom lens system of claim 14, wherein lenses disposed second and third closest to the object side among at least one lens of the first lens group form a cemented lens, and the lenses satisfy:

$Vd12<55$, and $Nd13>1.90$, wherein Vd12 indicates an Abbe number at a d line of a lens disposed second closest to the object side of the first lens group, and Nd13 indicates a refractive index at a d line of a lens disposed third closest to the object side of the first lens group.

18. The zoom lens system of claim 14, wherein a lens disposed closest to the object side among the at least one lens of the second lens group satisfies:

$Vd24>60$, wherein Vd24 indicates an Abbe number at a d line of the lens disposed closest to the object side among the at least one lens of the second lens group.

19. The zoom lens system of claim 14, wherein lenses disposed third and fourth closest to the object side among the at least one lens of the second lens group satisfy:

$Vd26<35$, and $Vd27>75$, where Vd26 indicates an Abbe number at a d line of the lens disposed third closest to the object side among the at least one lens of the second lens group, and Vd27 indicates an Abbe number at the d line of the lens disposed fourth closest to the object side among the at least one lens of the second lens group.

* * * * *